(12) United States Patent
Ishida et al.

(10) Patent No.: US 10,175,497 B2
(45) Date of Patent: Jan. 8, 2019

(54) ILLUMINATION DEVICE AND PROJECTOR

(71) Applicant: Dai Nippon Printing Co., Ltd., Tokyo (JP)

(72) Inventors: Kazutoshi Ishida, Tokyo (JP); Makio Kurashige, Tokyo (JP)

(73) Assignee: Dai Nippon Printing Co., Ltd., Shinjuku-Ku (JP)

( * ) Notice: Subject to any disclaimer, the term of this patent is extended or adjusted under 35 U.S.C. 154(b) by 0 days.

(21) Appl. No.: 15/129,095

(22) PCT Filed: Mar. 26, 2015

(86) PCT No.: PCT/JP2015/059420
§ 371 (c)(1),
(2) Date: Sep. 26, 2016

(87) PCT Pub. No.: WO2015/147185
PCT Pub. Date: Oct. 1, 2015

(65) Prior Publication Data
US 2017/0108704 A1    Apr. 20, 2017

(30) Foreign Application Priority Data
Mar. 27, 2014 (JP) .................. 2014-066765

(51) Int. Cl.
*G02B 27/48* (2006.01)
*G02B 13/00* (2006.01)
(Continued)

(52) U.S. Cl.
CPC .............. *G02B 27/48* (2013.01); *G02B 3/00* (2013.01); *G02B 13/0095* (2013.01);
(Continued)

(58) Field of Classification Search
CPC .. H04N 9/3129; H04N 9/3164; H04N 9/3161; G03B 21/208; G03B 21/2033;
(Continued)

(56) References Cited

U.S. PATENT DOCUMENTS

2003/0039036 A1   2/2003  Kruschwitz et al.
2003/0072012 A1   4/2003  Kitabayashi
(Continued)

FOREIGN PATENT DOCUMENTS

EP    2 708 948 A1    3/2014
JP    2009-163901 A1    7/2009
(Continued)

OTHER PUBLICATIONS

International Search Report and Written Opinion (PCT/JP2015/059420) dated Jun. 16, 2015.
(Continued)

*Primary Examiner* — Christina Riddle
*Assistant Examiner* — Christopher Lamb, II
(74) *Attorney, Agent, or Firm* — Burr & Brown, PLLC

(57) ABSTRACT

An illumination device includes an irradiation device, a diffusing element, a first lens array, a second lens array and a deflecting element, which are arranged in this order along the light path. Diffused light that has entered a particular region on the diffusing element and has been diffused by the diffusing element, and diffused light that has entered a region, which differs from the particular region, on the diffusing element and has been diffused by the diffusing element, travel to regions which at least partly overlap each other. The diffusion angle of diffused light exiting the diffusing element is not more than the acceptable angle formed between two line segments LS extending from the principal point of a second unit lens of the second lens array to both ends of a first unit lens of the first lens array.

11 Claims, 9 Drawing Sheets

(51) Int. Cl.
  *G02B 13/16* (2006.01)
  *G02B 26/10* (2006.01)
  *G03B 21/20* (2006.01)
  *H04N 9/31* (2006.01)
  *G02B 3/00* (2006.01)
  *G02B 19/00* (2006.01)
(52) U.S. Cl.
  CPC ............ *G02B 13/16* (2013.01); *G02B 19/00* (2013.01); *G02B 26/101* (2013.01); *G02B 26/105* (2013.01); *G03B 21/208* (2013.01); *G03B 21/2033* (2013.01); *G03B 21/2066* (2013.01); *H04N 9/3129* (2013.01); *H04N 9/3152* (2013.01); *H04N 9/3161* (2013.01); *H04N 9/3164* (2013.01)
(58) Field of Classification Search
  CPC ............ G03B 21/2066; G03B 21/2013; G02B 26/10; G02B 26/101; G02B 26/105; G02B 27/48; G02B 27/0961
  See application file for complete search history.

(56) References Cited

U.S. PATENT DOCUMENTS

| | | |
|---|---|---|
| 2003/0133078 A1 | 7/2003 | Iechika et al. |
| 2005/0122487 A1* | 6/2005 | Koyama ................ A47F 11/06 353/94 |
| 2008/0187012 A1 | 8/2008 | Yamauchi et al. |
| 2009/0168424 A1 | 7/2009 | Yamauchi et al. |
| 2010/0020291 A1 | 1/2010 | Kasazumi et al. |
| 2011/0043876 A1 | 2/2011 | Kurashige et al. |
| 2012/0051044 A1* | 3/2012 | Akiyama ........... G03B 21/2013 362/233 |
| 2012/0147334 A1* | 6/2012 | Mizushima .......... G02B 13/007 353/31 |
| 2012/0242961 A1* | 9/2012 | Miura ................ G02B 27/0961 353/38 |
| 2013/0169941 A1 | 7/2013 | Kurashige et al. |
| 2014/0028985 A1* | 1/2014 | Janssens ................ G02B 27/48 353/31 |
| 2014/0043591 A1* | 2/2014 | Kurashige ............. G02B 27/48 353/85 |
| 2014/0118702 A1 | 5/2014 | Taniguchi et al. |
| 2014/0133018 A1* | 5/2014 | Matsubara ........... G03B 21/625 359/448 |
| 2014/0232996 A1* | 8/2014 | Okamoto ............... G02B 27/48 353/85 |
| 2015/0036108 A1 | 2/2015 | Taniguchi et al. |

FOREIGN PATENT DOCUMENTS

| | | |
|---|---|---|
| JP | 2011-043603 A1 | 3/2011 |
| JP | 2012-058481 A1 | 3/2012 |
| JP | 2012-058482 A1 | 3/2012 |
| JP | 2012-123381 A1 | 6/2012 |
| JP | 2012-226271 A1 | 11/2012 |
| JP | 2012-226272 A1 | 11/2012 |
| JP | 2012-237813 A1 | 12/2012 |
| JP | 2012-237814 A1 | 12/2012 |
| JP | 2013-222058 A1 | 10/2013 |
| TW | 544545 B | 8/2003 |
| TW | 1230805 B | 4/2005 |

OTHER PUBLICATIONS

European Office Action, European Application No. 15769453, dated Jul. 31, 2017 (9 pages).

* cited by examiner

ILLUMINATION DEVICE AND PROJECTOR

BACKGROUND

1. Technical Field

The present disclosure relates to an illumination device and to a projector including the illumination device.

2. Description of the Related Art

An illumination device which emits coherent light, such as laser light, has the problem of the formation of speckles. The "speckles" refer to a speckle pattern that may appear on a scattering surface when it is irradiated with coherent light such as laser light. Speckles, when formed on a screen, are observed as speckled uneven luminance, in other word uneven brightness, which can have a physiologically harmful influence on the viewer. In order to solve the speckle problem, JP 2012-237813A has proposed an illumination device in which the incident angle of illumination light entering a scattering surface changes with time. Speckles on the scattering surface, caused by diffusion of coherent light, are therefore superimposed and time-averaged, whereby the speckles are obscured.

In particular, the illumination device disclosed in JP 2012-237813A includes a light source for emitting coherent light, a first lens array, a second lens array and a condenser lens, which are arranged in this order along the light path. The light source irradiates the first lens array with a parallel light flux in a constant direction in such a manner that the irradiating light scans the first lens array. Light that has exited a unit lens contained in the first lens array enters a corresponding unit lens of the second lens array; and such lights are condensed by the condenser lens into an illumination region. In the illumination device disclosed in JP 2012-237813A, a position on the condenser lens, at which coherent light leaves the lens for the illumination region, changes with time. Accordingly, the illumination region is to be illuminated from various directions corresponding to various regions of the optical element.

As shown in FIG. 10, in the illumination device disclosed in JP 2012-237813A, light that has entered a unit lens 156 of a first lens array 155 focuses on a unit lens 161 of a second lens array 160, corresponding to the unit lens 156, and the light is directed by a condenser lens 165 toward an illumination region LZ. Particularly in the illumination device 140, light from the light source enters each unit lens 156 of the first lens array 155 from a constant direction. Therefore, light that has entered each unit lens 156 of the first lens array 155 passes through a focal point fp located on a unit lens 161 of the second lens array 160, corresponding to the unit lens 156. The illumination device makes it possible to use light from the light source at a high efficiency. Coherent light, which can cause speckles, is especially excellent in the spatial coherency. Therefore, when coherent light is used, light entering the second lens array 160 can be efficiently collected on the focal points fp on the unit lenses 161. The use of coherent light is thus preferred from the viewpoint of light use efficiency.

However, in the illumination device disclosed in JP 2012-237813A, light beams that have entered a unit lens 156 of the first lens array 155 all pass through a predetermined position on the second lens array 160, namely, the focal point fp of the unit lens 156. Accordingly, the incident direction of light, which has exited the condenser lens 165 and enters the illumination region LZ, changes stepwise, not continuously. It is therefore possible that speckles may not be obscured effectively especially when using coherent light which can be efficiently collected on the focal points fp on the unit lenses 161.

Further, in the case where a region of the first lens array 155 which coherent light enters at a certain moment, i.e. a light spot on the first lens array 155, formed by coherent light from the light source, is smaller than the size of each unit lens 156 as shown in FIG. 11, light from the light source enters only part of a unit lens 156 contained in the first lens array 155 and, in addition, there exists a time period during which light scans the unit lens 156. During the time period, the illumination region L is irradiated with light only from an approximately constant direction. It is highly possible in this case that the speckle reduction effect will be low.

SUMMARY

An illumination device according to an embodiment of the present invention includes:

a diffusing element;

an irradiation device for irradiating the diffusing element with coherent light in such a manner that the light scans the diffusing element;

a first lens array for changing a path of coherent light that has been diffused by the diffusing element;

a second lens array, facing the first lens array, for changing a path of light whose light path has been changed by the first lens array; and a deflecting element, facing the second lens array, for changing a path of light whose light path has been changed by the second lens array, wherein diffused light that has entered a particular region on the diffusing element and has been diffused by the diffusing element, and diffused light that has entered a region, which differs from the particular region, on the diffusing element and has been diffused by the diffusing element travel to regions which at least partly overlap each other after the paths of the diffused lights are each controlled by the first lens array, the second lens array and the deflecting element, wherein the first lens array includes first unit lenses, and the second lens array includes second unit lenses each corresponding to each first unit lens, and wherein in a plane parallel to an optical axis of a first unit lens and crossing the first unit lens along a maximum width, a diffusion angle of diffused light exiting the diffusing element is not more than an acceptable angle formed between two line segments extending from a principal point of a second unit lens, corresponding to the first unit lens, to both ends of the first unit lens.

A projector according to an embodiment of the present invention includes:

any one of the above-described illumination devices; and a spatial light modulator to be illuminated with light from the illumination device.

A projection display device according to an embodiment of the present invention includes:

any one of the above-described projectors; and a display member onto which light from the spatial light modulator is to be projected.

DESCRIPTION OF EMBODIMENTS

Figure 1:
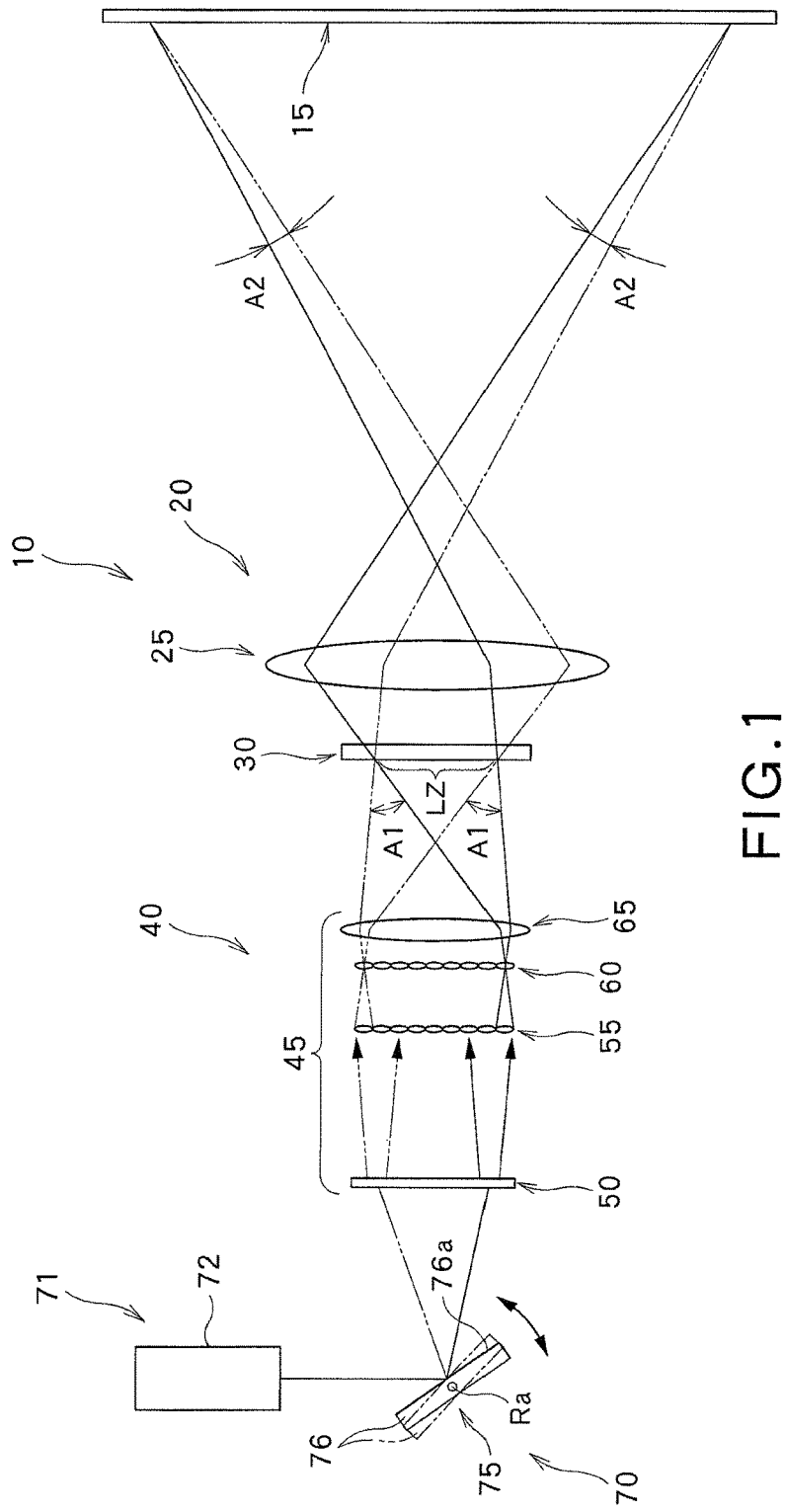
FIG. 1 is a diagram illustrating an embodiment of the present invention and showing a schematic construction of a projector and projection display device.

Some embodiments of the present invention will now be described with reference to the drawings. In the drawings attached hereto, scales, horizontal to vertical dimensional ratios, etc. are exaggeratingly modified from those of the real things for the sake of illustration and easier understanding.

The terms used herein to specify a shape or geometric conditions, or the degree thereof, such as "parallel", "same", etc., and the below-described values for length and angle should not be bound to their strict sense, and should be construed to include equivalents or resemblances from which the same function or effect can be expected.

The projection image display device 10 shown in FIG. 1 includes a screen 15 and a projector 20 for projecting image light. The projector 20 includes an illumination device 40 which illuminates an illumination region LZ lying on an imaginary plane with coherent light, a spatial light modulator 30 disposed in a position overlapping the illumination region LZ and to be illuminated by the illumination device 40, and an optical projection system 25 for projecting coherent light from the spatial light modulator 30 onto the screen 15. Thus, in the embodiment described here, the illumination device 40 is incorporated, as an illumination device for illuminating the spatial light modulator 30, into the projector 20. The illumination device 40, which illuminates the illumination region LZ with coherent light, is designed to obscure speckles.

At the outset, the illumination device 40 will be described. As shown in FIG. 1, the illumination device 40 includes an irradiation device 70 which emits coherent light, and a light path control element 45 for directing light from the irradiation device 70 toward a particular region.

In the illumination device 40, the irradiation device 70 irradiates the light path control element 45 with coherent light in such a manner that the light scans the light path control element 45. Therefore, a region on the light path control element 45, which is being irradiated with coherent light by the irradiation device 70 at a certain moment, is part of the light entrance surface of the light path control element 45. The light path control element 45 controls the light path so that coherent light that has entered a particular region on the scan path and coherent light that has entered a region, which differs from the particular region, on the scan path both enter the illumination region LZ. Particularly in the embodiment described below, the path of coherent light, emitted from the irradiation device 70 to irradiate the light path control element 45, is controlled so that lights that have entered divided regions of the surface of a diffusing element 50, constituting the light entrance surface of the light path control element 45, all enter and illuminate the illumination region LZ.

The irradiation device 70 includes a light source device 71 for emitting coherent light of a particular wavelength band, and a scanning device 75 for directing the traveling direction of light from the light source device 71 toward the light path control element 45. The light source device 71 includes a light source 72 which generates coherent light, e.g. a laser light source 72.

The scanning device 75, on the other hand, is a device to changes with time the path of coherent light from the light source 72. In the illustrated example, the scanning device 75 includes a light path changing member which is capable of rotating around a rotation axis Ra. The light path changing member itself functions to change the path of incident light. The light path changing member moves on the rotation axis Ra. Thus, the illustrated irradiation device 70 is configured as a one-dimensional scanning device. While a prism, for example, may be used as the light path changing member, in the illustrated example the light path changing member is configured as a reflecting member 76 having a reflecting surface 76a. The reflecting member 76 is held such that it is rotatable on the rotation axis Ra which is parallel to the reflecting surface 76a. The scanning device 75 may be, for example, a conjugate mirror device.

The light path control element 45 will now be described. As described above, the light path control element 45 has a light path control function which directs light, entering a region, toward a particular direction dependent on a position of the region. The light path control element 45 described here changes the traveling directions of lights entering various regions, and condenses the lights into the illumination region LZ. Thus, coherent lights from the irradiation device 70, irradiating divided regions of the light entrance surface of the light path control element 45, pass through the light path control element 45 and then travel toward the illumination region LZ.

Figure 2:
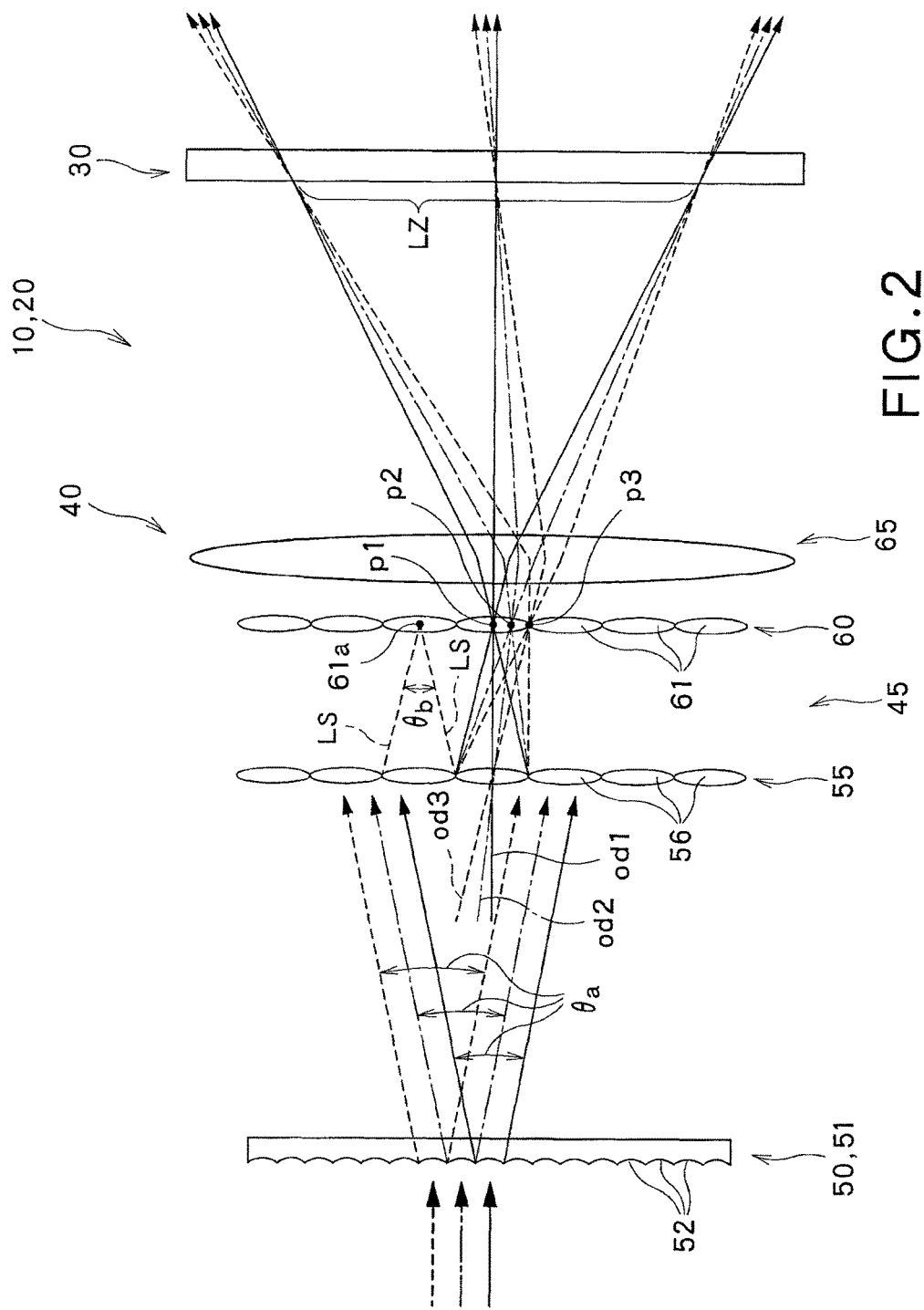
FIG. 2 is a diagram showing an illumination device included in the projector of FIG. 1.

As shown in FIGS. 1 and 2, the light path control element 45 includes the diffusing element 50 having a surface as a light entrance surface of the light path control element 45, a first lens array 55 for changing the path of coherent light that has been diffused by the diffusing element 50, a second lens array 60 for changing the path of light whose light path has been changed by the first lens array 55, and a deflecting element 65 for changing the path of light whose light path has been changed by the second lens array 60. These optical elements, constituting the light path control element 45, are disposed opposite each other. The "lens array" herein refers to an assembly of small lenses also called unit lenses, and functions as an element that changes the traveling direction of light by refraction or reflection.

In the example illustrated in FIGS. 1 and 2, the diffusing element 50 may include a lens array 51 formed, taking into consideration the incident direction of light from the irradiation device 70. In the example illustrated in FIG. 2, the lens array 51 includes concave unit lenses 52 and the concave unit lenses 52 are arranged to cover all over a plan. The unit lenses 52 constituting the lens array 51 are arranged on an imaginary plane perpendicular to the optical axes of the unit lenses 52. The lens array 51 diffuses light incident on various regions corresponding to the unit lens 52. Thus, the unit lenses 52 function as the unit diffusing elements of the diffusing element 50.

In the example illustrated in FIG. 2, the first lens array 55 includes convex first unit lenses 56, and the convex first unit lenses 56 are arranged to cover all over a plan. The first unit lenses 56 are arranged such that their optical axes are parallel to each other. Further, the first unit lenses 56 are arranged on an imaginary plane perpendicular to the optical axes of the first unit lenses 56. The second lens array 60 has the same construction as the first lens array 55, and includes convex second unit lenses 61. The convex second unit lenses 61 are arranged to cover all over a plan. Thus, in this embodiment, the two lens arrays having the same construction are used as the first lens array 55 and the second lens array 60. The first lens array 55 and the second lens array 60 are disposed such that the optical axes of the unit lenses 56, 61 are parallel to each other. Further, a second unit lens 61 of the second lens array 60 is disposed opposite a first unit lens 56. Particularly in this embodiment, the first lens array 55 and the second lens array 60 are disposed such that in a projection along the optical axes of the unit lenses 56, 61, the contour of each first unit lens 56 overlaps the contour of the corresponding second unit lens 61.

On the other hand, in the example illustrated in FIG. 2, the deflecting element 65 is configured as a lens disposed opposite the second lens array 60 and which functions as a condenser lens or a field lens. The optical elements constituting the light path control element 45 are disposed such that the optical axes of the unit lenses 52 of the diffusing element 50, the optical axes of the first unit lenses 56 of the first lens array 55, the optical axes of the second unit lenses 61 of the second lens array 60, and the optical axis of the lens constituting the deflecting element 65 are parallel to each other.

When coherent light having a certain spot size enters the thus-constructed light path control element 45, the coherent light is diffused by a unit lens(es) 52 of the lens array 51 constituting the diffusing element 50 and, in the form of a divergent light flux, travels toward the first lens array 55. In the example illustrated in FIG. 2, any region on the diffusing element 50 that coherent light enters at a moment includes at least one unit lens 52, i.e. contains the contour of at least one unit lens 52. Further, in the example illustrated in FIG. 2, any region on the first lens array 55 that diffused light from the diffusing element 50 enters at a moment includes at least one first unit lens 56, i.e. contains the contour of at least one first unit lens 56. The diffusing element 50 and the first lens array 55 are positioned such that the optical axis of a divergent light flux, formed by diffusion of light in at least one unit lens 52, is parallel to the optical axes of the first unit lenses 56. The phrase "optical axis of a divergent light flux" or "optical axis of diffused light" herein refers to a direction along a light path that extends centrally in a region which the divergent light flux or the diffused light passes through.

As shown in FIG. 2, in a cross-section parallel to the optical axes of the first unit lenses 56 and crossing those portions of the first unit lenses 56 which have the maximum widths, the diffusion angle θa of diffused light exiting the diffusing element 50 is not more than the acceptable angle θb formed between two line segments LS extending from the principal point 61a of each second unit lens 61 to both ends of a first unit lens 56 corresponding to the second unit lens 61. Thus, the following relation is satisfied: θa≤θb. The "principal point" refers to the optical center of a lens, and is the center point in the definition of the focal length of the lens.

Figure 3:
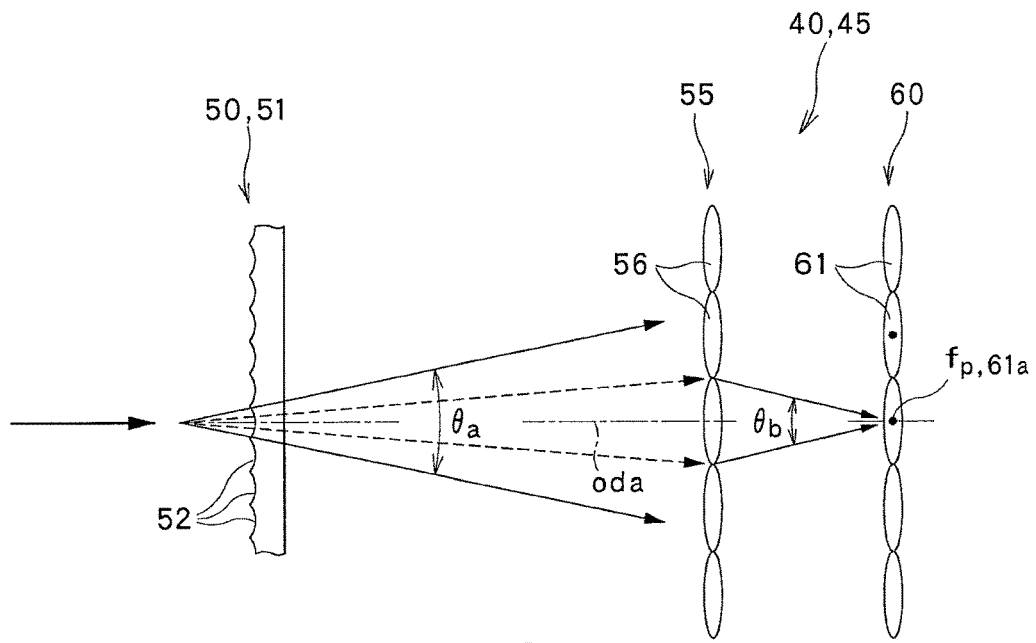
FIG. 3 is an enlarged view of a portion of FIG. 1.

In addition, as shown in FIG. 3, the principal point 61a of each second unit lens 61 of the second lens array 60 is located on the rear focal point fp of a first unit lens 56 corresponding to the second unit lens 61. Thus, referring to FIG. 3, the optical axis of a divergent light flux from the diffusing element 50 aligns with the optical axis of a first unit lens 56 contained in the first lens array 55. The principal point 61a of a second unit lens 61 corresponding to the first unit lens 56 is located on the rear focal point fp of the first unit lens 56, determined for the divergent light flux.

The spatial light modulator 30 will now be described. The spatial light modulator 30 is disposed in a position overlapping the illumination region LZ. The spatial light modulator 30 is illuminated by the illumination device 40, and forms a modulated image. Light from the illumination device 40 illuminates only the entire illumination region LZ. Therefore, the light entrance surface of the spatial light modulator 30 preferably has the same shape and size as the illumination region LZ to be irradiated with light by the illumination device 40. This enables light from the illumination device 40 to be used with high efficiency in the formation of a modulated image.

There is no particular limitation on the spatial light modulator 30; various known spatial light modulators can be used. Examples may include a digital mirror device (DMD), which is a spatial light modulator that forms a modulated image without utilizing polarization, and a transmissive liquid crystal micro-display and a reflective LCoS (Liquid Crystal on Silicon, registered trademark) which form a modulated image utilizing polarization.

In the case where the spatial light modulator 30 is a transmissive liquid crystal micro-display as in the embodiment illustrated in FIG. 1, the spatial light modulator 30, illuminated planarly by the illumination device 40, transmits coherent light selectively for each pixel, thereby forming a modulated image on the screen of the display constituting the spatial light modulator 30. The modulated image thus obtained is finally projected by the optical projection system 25 onto the screen 15 while maintaining or changing the size at a particular magnification. A viewer can view the image projected on the screen 15. The screen 15 may be configured either as a transmissive screen or as a reflective screen.

The operation of the illumination device 40, the projector 20 and the projection display device 10, having the above-described construction, will now be described.

First, the irradiation device 70 irradiates the diffusing element 50 of the light path control element 45 with coherent light in such a manner that the coherent light scans the diffusing element 50. More specifically, coherent light of a particular wavelength band that travels in a constant direction is generated by the light source 72 of the light source device 71, and the traveling direction of the coherent light is changed by the scanning device 75. The scanning device 75 performs a periodic operation so that the incident position on the diffusing element 50 at which coherent light enters the diffusing element 50 changes periodically.

Coherent light that has entered each unit lens 52 of the diffusing element 50 is diffused by the diffusing function of the diffusing element 50 and, in the form of a divergent light flux, travels toward the first lens array 55. In the embodiment illustrated in FIGS. 1 through 5, the optical axis of a divergent light flux formed by each unit lens 52 of the diffusing element 50 is parallel to the optical axes of the first unit lenses 56 of the first lens array 55. Light that has entered the first lens array 55 travels toward the second lens array 60 along a light path which is controlled by the light path control function of each first unit lens 56. Similarly, light that has entered the second lens array 60 travels toward the deflecting element 65 along a light path which is controlled by the light path control function of each second unit lens 61.

As shown in FIGS. 1 and 2, the irradiation device 70 projects coherent light onto the diffusing element 50 in such a manner that the incident position on the diffusing element 50 changes with time. Accordingly, the incident position on the deflecting element 65, which light enters after passing through the first and second lens arrays 55, 60, also changes with time. Coherent lights that have entered various regions of the deflecting element 65 are directed toward the illumination region LZ by the light path control function of the deflecting element 65 and act as illumination light that illuminates the entire illumination region LZ.

Thus, coherent lights that have entered various regions of the light path control element 45 are superimposed in the illumination region LZ by the light path control function of the light path control element 45. Coherent lights that have been emitted from the irradiation device 70 and entered various regions of the light path control element 45 are each diffused or expanded in the light path control element 45, and enter the entire illumination region LZ. The irradiation device 70 can illuminate the illumination region LZ with coherent light in this manner.

As shown in FIG. 1, in the projector 20, the spatial light modulator 30 is disposed in a position overlapping the illumination region LZ to be illuminated by the illumination device 40. Therefore, the spatial light modulator 30 is illuminated planarly by the illumination device 40, and transmits coherent light selectively for each pixel, thereby forming an image. The image is projected by the optical projection system 25 onto the screen 15. The coherent light projected onto the screen 15 is diffused, and perceived by the viewer as an image.

It is possible that coherent light projected onto the screen 15 may cause interference due to diffusion, resulting in the formation of speckles. In this regard, the illumination device 40 of this embodiment can quite effectively obscure speckles, as will be described below.

Multiplexing of various parameters such as polarization, phase, angle, time, etc. to increase the number of modes is considered an effective way to obscure speckles. The "modes" herein refer to speckle patterns which are independent from one another. For example, when coherent light is projected in different directions from a plurality of laser light sources onto the same screen, there exist the same number of modes as the number of the laser light sources. When coherent light is projected onto a screen from a single laser light source in time-divisional different directions, there exist the same number of modes as the number of changes in the incident direction of coherent light during a time period which is so short that the change cannot be resolved by human eyes. It is considered that when there are a large number of modes, light interference patterns are superimposed in an uncorrelated manner and averaged, and this will obscure speckles observed by viewers' eyes.

In the above-described illumination device 40, the diffusing element 50 is irradiated with coherent light in such a manner that the coherent light scans the diffusing element 50. Coherent lights from the irradiation device 70, which have entered various regions of the diffusing element 50, each illuminate the same entire illumination region LZ. Since the region on the deflecting element 65 which coherent light enters changes with time, the incident direction of coherent light entering the illumination region LZ also changes with time.

Thus, coherent lights from the irradiation device 70, which have entered various regions of the diffusing element 50, each illuminate the same entire illumination region LZ; however, the coherent lights illuminate the illumination region LZ in different directions. Since the region on the diffusing element 50 which coherent light enters changes with time, the incident direction of coherent light entering the illumination region LZ also changes with time.

The incident direction of coherent light, continually entering various regions in the illumination region LZ, continues to change as shown by the arrows A1 in FIG. 1. Accordingly, light that forms each pixel of an image, formed by light that has passed through the spatial light modulator 30, is projected onto a particular position on the screen 15 while changing its light path with time as shown by the arrows A2 in FIG. 1.

It will be appreciated from the foregoing that by using the above-described illumination device 40, the incident direction of coherent light changes with time at various positions on the screen 15 displaying an image, and that the change is so fast that it cannot be resolved by human eyes. Accordingly, superimposed uncorrelated scattering patterns of coherent light are observed by human eyes. Therefore, speckle patterns formed, corresponding to the scattering patterns, are superimposed and averaged when they are observed by a viewer. Speckles can thus be quite effectively obscured to a viewer who is viewing an image displayed on the screen 15.

Conventional speckles observed by humans include not only screen-side speckles which are formed due to scattering of coherent light on the screen 15, but also projector-side speckles which are formed due to scattering of coherent light before it is projected onto the screen 15. Such a projector-side speckle pattern could be perceived by a viewer when the speckle pattern is projected onto the screen 15 via the spatial light modulator 30. However, according to this embodiment, coherent light continuously scans the diffusing element 50 of the light path control element 45, and coherent lights, which have entered various regions of the light path control element 45, each illuminate the entire area of the illumination region LZ which overlaps with the spatial light modulator 30. Thus, the light path control element 45 forms a new wavefront which is different from a previous wavefront that forms a speckle pattern, resulting in complex and uniform illumination of the illumination region LZ, and also of the screen 15 via the spatial light modulator 30. The projector-side speckle pattern is made invisible by the formation of such a new wavefront in the light path control element 45.

Particularly in the illumination device 40 of this embodiment, coherent light emitted from the irradiation device 70 is diffused in the diffusing element 50 and, in the form of a divergent light flux, enters the first lens array 55. Therefore, as the region on the diffusing element 50 which coherent light enters changes, the optical axis od1, od2, od3 of diffused light that enters a first unit lens 56, constituting the first lens array 55, also changes.

Figure 10:
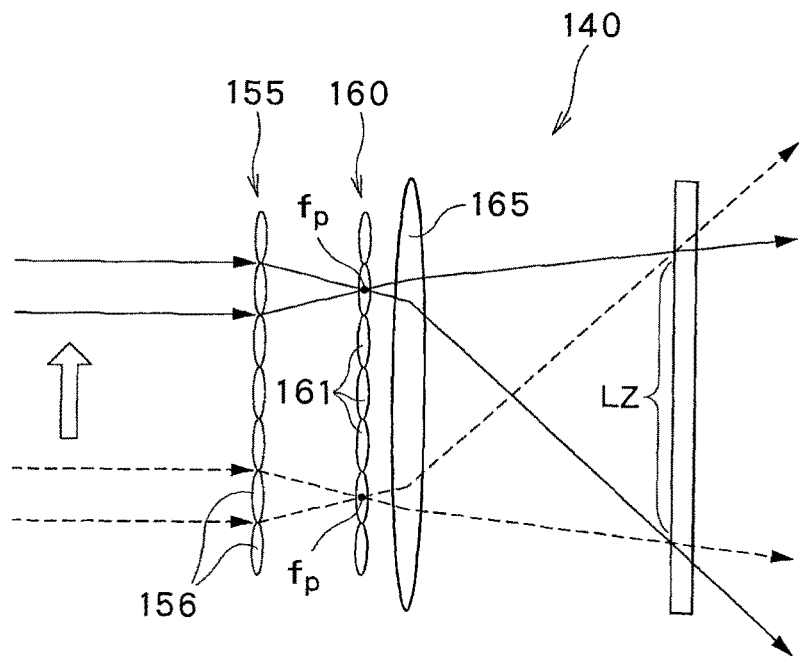
FIG. 10 is a diagram showing a portion of an illumination device according to a reference example.

With the change in the optical axis od1, od2, od3 of diffused light, the incident position on a second unit lens 61 corresponding to the first unit lens 56, which the coherent light enters, also changes. Particularly in this embodiment, the position p1, p2, p3 on the second unit lens 61 corresponding to the first unit lens 56, on which coherent light converges, also changes. Accordingly, with the change in the incident position on the diffusing element 50 which coherent light from the irradiation device 70 enters, the incident position on the deflecting element 65 which coherent light from the first unit lens 56 enters also changes. The incident direction of illumination light which has exited the deflecting element 65 and enters the illumination region LZ, i.e. the illumination direction, can thus be changed in a continuous manner. Therefore, compared to the illumination device described above with reference to FIGS. 10 and 11, speckles can be obscured quite effectively.

Figure 5:
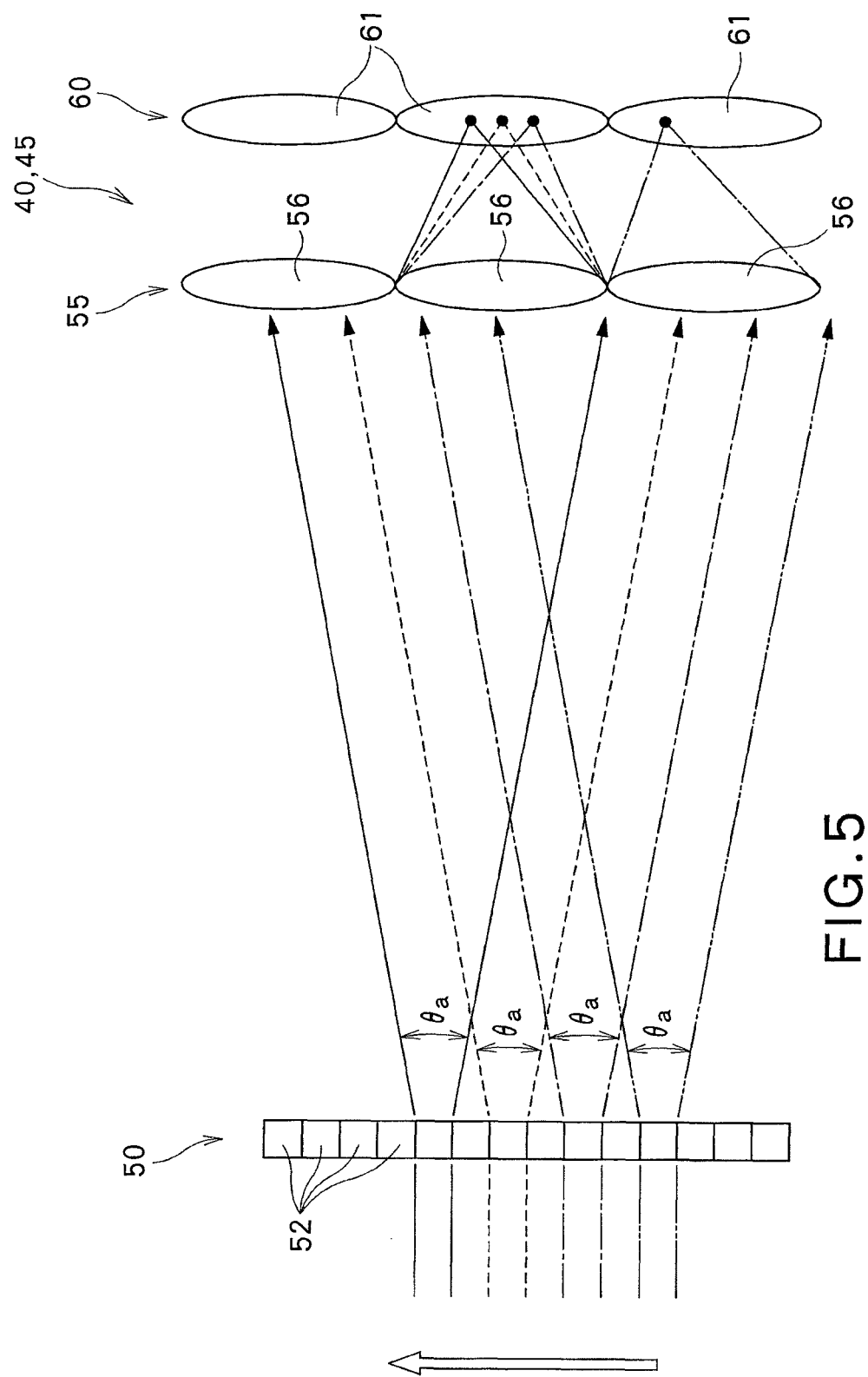
FIG. 5 is a diagram illustrating the action of the illumination device.
Figure 11:
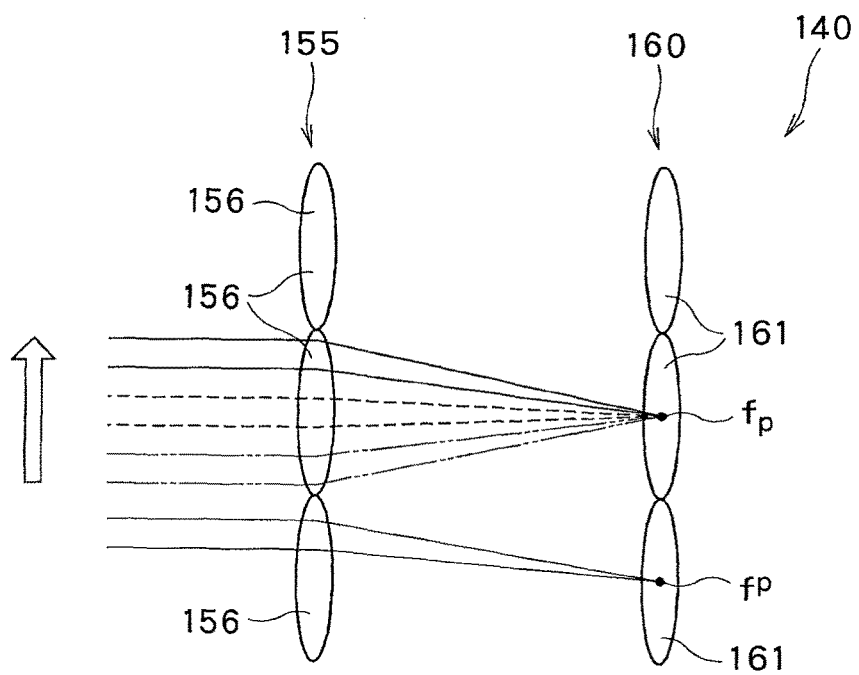
FIG. 11 is an enlarged view of a portion of FIG. 10.

FIG. 5 shows a light path in the case where the light path control element 45 is irradiated with coherent light under the same conditions as shown in FIG. 11. It will be appreciated that according to the embodiment illustrated in FIG. 5, in which coherent light is formed into a divergent light flux by the diffusing element 50 before the light enters a first unit lens 56, the incident direction of illumination light entering the illumination region LZ changes continuously as compared to the conventional illumination device shown in FIG. 11.

Figure 4:
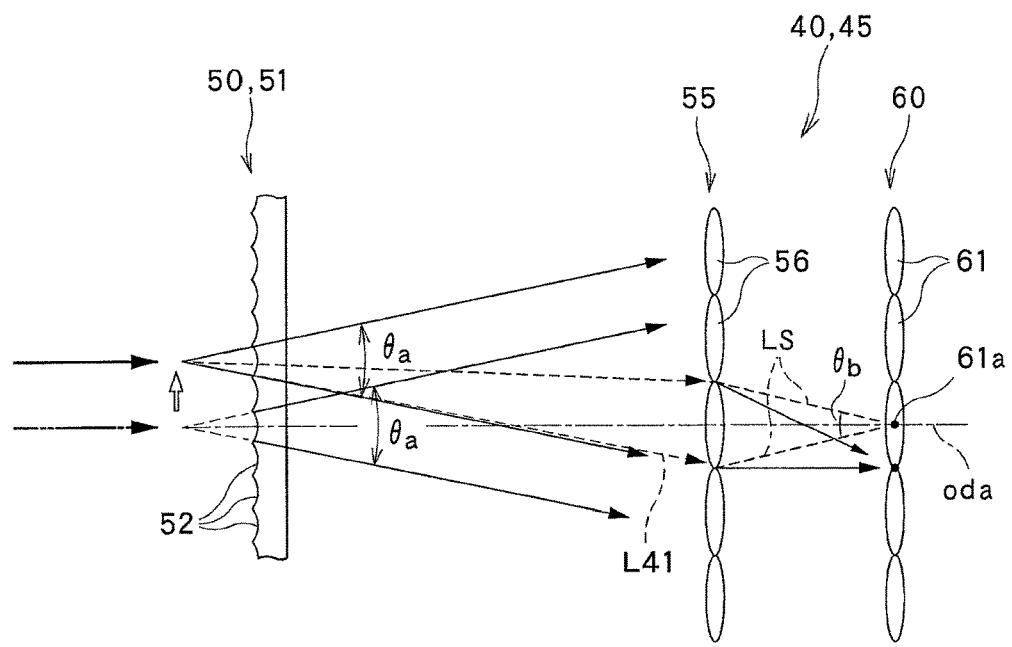
FIG. 4 is an enlarged view of a portion of FIG. 1.

In the illumination device 40 of this embodiment, as shown in FIG. 3, in a plane parallel to the optical axis oda of a first unit lens 56 and crossing the first unit lens 56 along the maximum width, the diffusion angle θa of diffused light exiting the diffusing element 50, which in the illustrated example is the angular range θa of the light exit direction of light existing a unit diffusing element 52, is not more than the acceptable angle θb formed between two line segments LS extending from the principal point 61a of a second unit lens 61, corresponding to the first unit lens 56, to both ends of the first unit lens 56. In this case, as shown in FIG. 4, light L41, which is contained in a divergent light flux from the diffusing element 50 and which is most inclined with respect to the optical axis oda of the first unit lens 56, is allowed to travel along a light path which is controlled by the first unit lens 56 at its end in the width direction, and enter the second unit lens 61 corresponding to the first unit lens 56. The provision of the diffusing element 50 can therefore prevent a significant reduction in the efficiency of use of coherent light generated by the light source 72.

According to the embodiment described hereinabove, it becomes possible to quite effectively obscure speckles while using light from the light source 72 at a high efficiency.

In the above-described embodiment, any region on the first lens array 55 that diffused light from the diffusing element 50 enters at a moment includes at least one first unit lens 56. Lights from the diffusing element 50, which have entered the at least one first unit lens 56, all enter the corresponding second unit lens(es) 61, and thus can be effectively used. Further, light from the diffusing element 50, which has entered the at least one first unit lens 56, passes through the second lens array 60 and the deflecting element 65, and is expanded to the entire illumination region LZ. Thus, the light can illuminate the illumination region LZ without causing uneven brightness.

Further, in the above-described embodiment, the principal point 61a of each second unit lens 61 of the second lens array 60 is located on a rear focal point fp which is formed when a divergent light flux from the irradiation device 70, having an optical axis parallel to the optical axis oda of a first unit lens 56 corresponding to the second unit lens 61, enters the first unit lens 56. This enables the light path control element 45 to perform light path control with higher accuracy, thereby effectively obscuring speckles.

Further, in the above-described embodiment, the diffusing element 50 includes the lens array 51 including the concave unit lenses 52. Unlike a convex lens which diffuses light after once focusing the light, a concave unit lens 52 can diffuse incident light and broaden the light path immediately after the light enters the unit lens 52. Therefore, as will be appreciated from FIG. 6, the distance between the diffusing element 50 and the first lens array 55 can be shortened. This enables downsizing of the illumination device 40 and the projector 20.

Various changes and modifications may be made to the embodiment described above. Some exemplary variations will now be described with reference to the relevant drawings. In the following description and relevant drawings, the same reference numerals are used to indicate the same or equivalent components as used in the above-described embodiment, and a duplicate description thereof is omitted.

Figure 6:
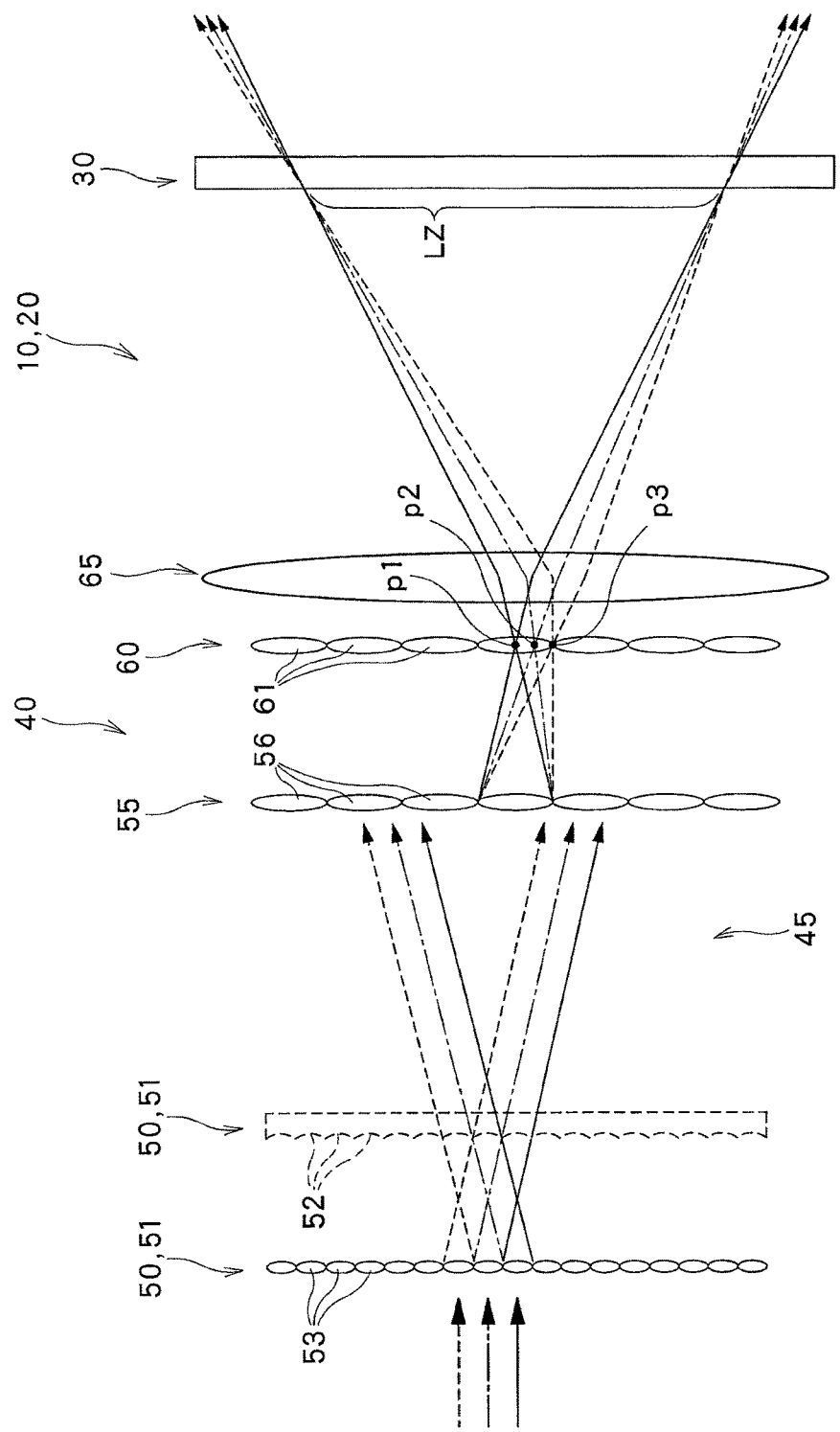
FIG. 6 is a diagram corresponding to FIG. 2, showing a variation of the illumination device.

Though in the above-described embodiment the lens array 51 of the diffusing element 50 includes concave unit lenses 52, an embodiment of the present invention is not limited to the use of such unit lenses; the lens array 51 of the diffusing element 50 may include convex unit lenses 53 as shown in FIG. 6. The broken lines in FIG. 6 indicate the disposition of the lens array of FIG. 2, including the concave unit lenses 52.

In the above-described embodiment the light source device 71 includes the single light source 72. However, the light source device 71 may include a plurality of light sources. For instance, the light source device 71 may be configured as a laser array including a plurality of laser light sources. The laser light sources of the light source device 71 may either generate lights of different wavelength bands or generate the same light of the same wavelength band. In the case of using a plurality of laser light sources that generate lights of different wavelength bands, the illumination region LZ can be illuminated, by additive color mixing, with light of a color which cannot be generated by a single light source. When the plurality of laser light sources generate light of a red wavelength band, light of a green wavelength band and light of a blue wavelength band, the illumination region LZ can be illuminated with while light. On the other hand, in the case of using a plurality of laser light sources that generate the same light of the same wavelength band, the illumination region LZ can be illuminated at a high power.

Figure 7:
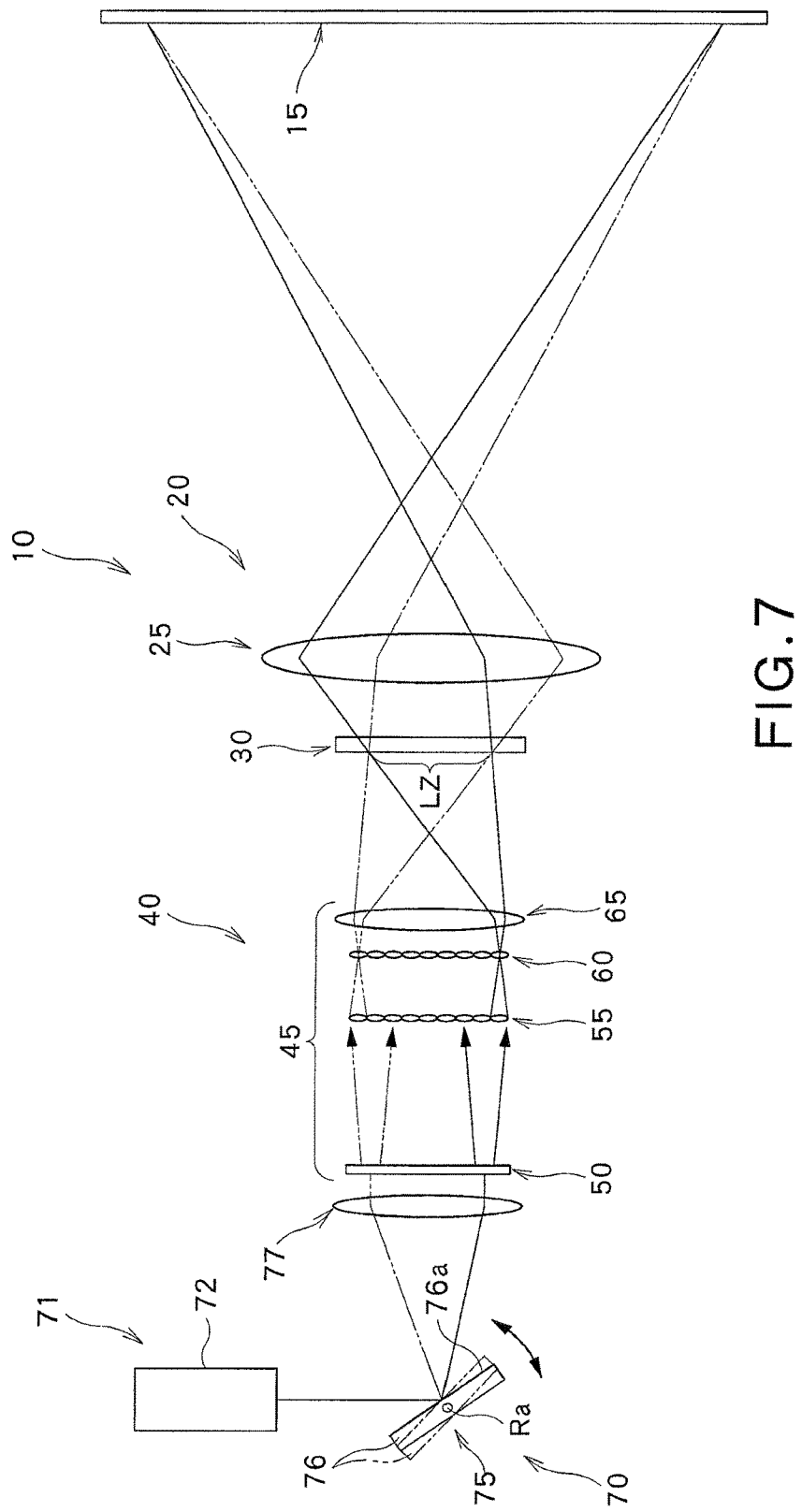
FIG. 7 is a diagram corresponding to FIG. 1, showing another variation of the illumination device.

In the above-described embodiment, the irradiation device 70 includes the light source device 71 and the scanning device 75 for directing the traveling direction of light from the light source device 71 toward the light path control element 45. Further, in the above-described embodiment, as shown in FIG. 1, light from the irradiation device 70 travels toward the light path control element 45 along a light path of a light beam contained in a divergent light flux. However, light from the irradiation device 70 may travel toward the light path control element 45 along a light path of a light beam contained in a parallel light flux. According to this variation, the light control function of the light path control element 45 can be performed with higher accuracy to effectively obscure speckles. In the embodiment shown in FIG. 7, the irradiation device 70 further includes a collimator 77 provided between the scanning device 75 and the light path control element 45. The collimator 77 may be, for example, a convex lens.

Though in the above-described embodiment the scanning device 75 is configured as a uniaxial rotating device which changes the traveling direction of coherent light by reflection, the scanning device 75 is not limited to such a uniaxial rotating device. The scanning device 75 may be configured such that the reflecting surface 76a of the reflecting member 76 is rotatable not only on the rotation axis Ra but also on a second rotation axis intersecting the rotation axis Ra. Further, the scanning device 75 may include two or more reflecting devices. In that case, the scanning device 75 can scan the diffusing element 50 along a two-dimensional scan path even if the reflecting surface of each reflecting device is rotatable only on a single axis. A MEMS mirror or the like is an exemplary reflecting device usable for the scanning device 75. The scanning device 75 may include a device other than a reflecting device which changes the traveling direction of coherent light by reflection. For example, the scanning device 75 may include a refractive prism or lens.

Though in the above-described embodiment the spatial light modulator 30 is disposed in the illumination region LZ to be illuminated by the illumination device 40, an embodiment of the present invention is not limited to this feature. For example, in the embodiments illustrated in FIGS. 8 and 9, the light entrance surface 37a of an optical equalization system 37 is disposed in the illumination region LZ. Accordingly, light from the illumination device 40 enters the optical equalization system 37. Light that has entered the optical equalization system 37 propagates through the optical equalization system 37 while repeating reflection, in particular total reflection, and exits the optical equalization system 37. The luminance of the light exit surface 37b of the optical equalization system 37 is equalized at various positions. An integrator rod, a kaleidoscope, a light pipe, etc. can be used as the optical equalization system 37.

Figure 8:
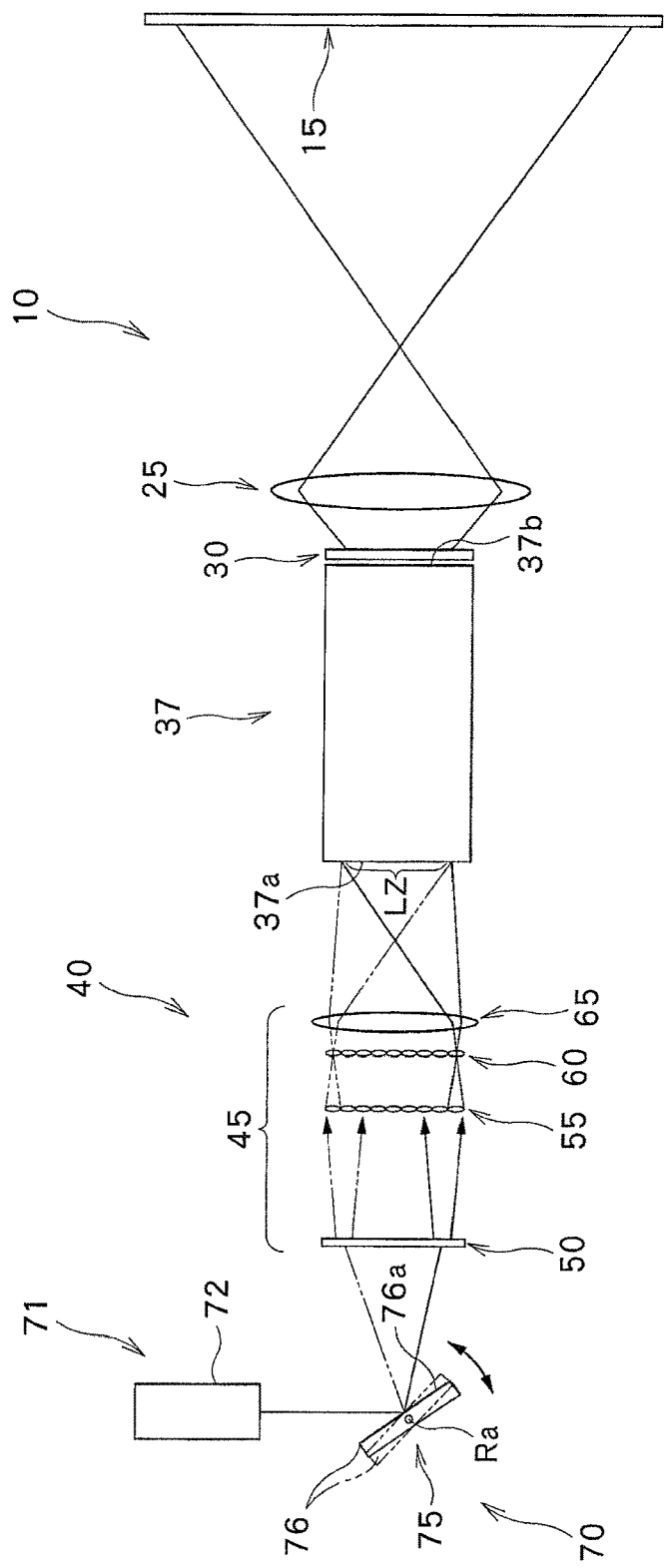
FIG. 8 is a diagram corresponding to FIG. 1, showing a variation of the projector.
Figure 9:
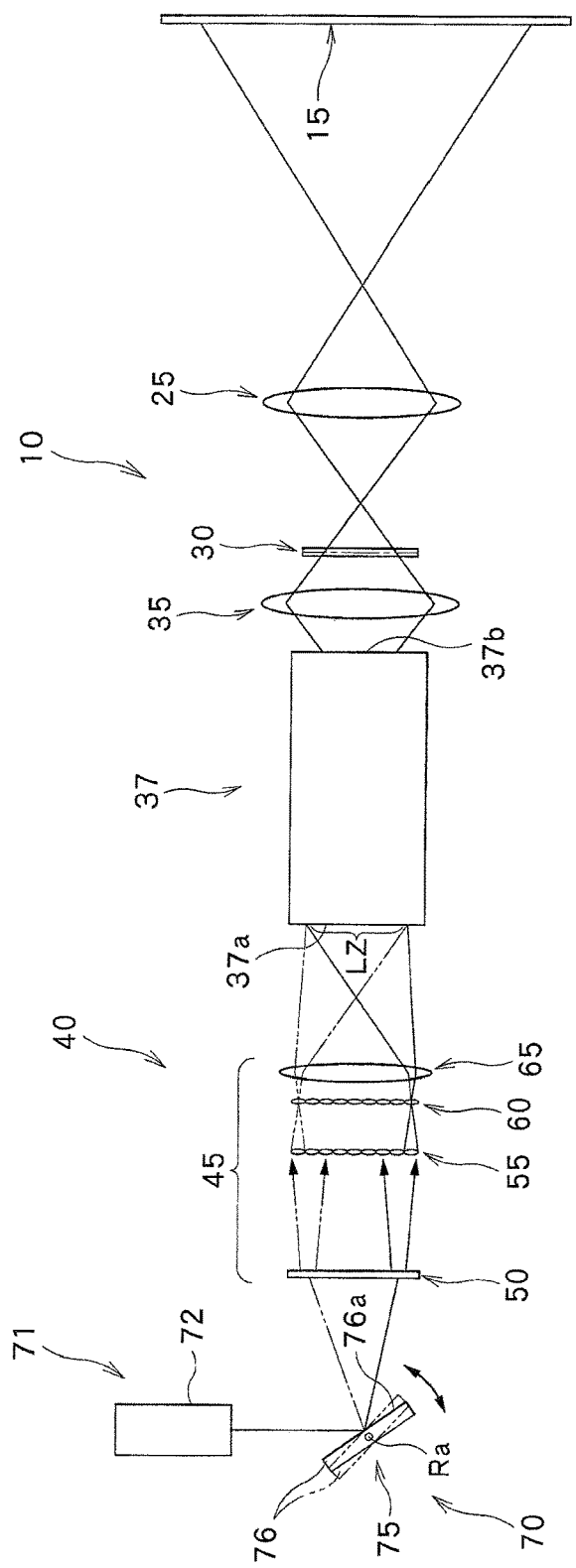
FIG. 9 is a diagram corresponding to FIG. 1, showing another variation of the projector.

In the embodiment illustrated in FIG. 8, the spatial light modulator 30 is disposed close and opposite to the light exit surface 37b of the optical equalization system 37, so that the spatial light modulator 30 can be illuminated with a uniform amount of light. On the other hand, in the embodiment illustrated in FIG. 9, a relay optical system 35 is disposed between the optical equalization system 37 and the spatial light modulator 30. With the relay optical system 35 interposed, the spatial light modulator 30 is disposed on a plane which is conjugate to the light exit surface 37b of the optical equalization system 37. Therefore, also in the embodiment illustrated in FIG. 9, the spatial light modulator 30 can be illuminated with a uniform amount of light.

In the above-described embodiment the illumination device 40 is incorporated into the projector 20 and the projection display device 10; however, the illumination device 40 can be used in a variety of applications. For example, the illumination device 40 can be used as an illumination device for a scanner.

The modifications described above can of course be made in an appropriate combination to the above-described embodiment.

The invention claimed is:

1. An illumination device comprising:
a diffusing element;
an irradiation device including a light source device configured to irradiate the diffusing element with coherent light and a scanner configured to scan the light on the diffusing element;
a first lens array for changing a path of coherent light that has been diffused by the diffusing element;
a second lens array, facing the first lens array, for changing a path of light whose light path has been changed by the first lens array; and
a deflecting element, facing the second lens array, configured to change a path of light whose light path has been changed by the second lens array,
wherein a first diffused light that has entered a first region on the diffusing element and has been diffused by the diffusing element, and a second diffused light that has entered a second region, which differs from the first region, on the diffusing element and has been diffused by the diffusing element, the first and second diffused lights being configured to travel to regions which at least partly overlap each other after the paths of the first and second diffused lights are respectively controlled by the first lens array, the second lens array and the deflecting element,
wherein the first lens array includes first unit lenses, and the second lens array includes second unit lenses each corresponding to each first unit lens,
wherein the diffusing element includes a lens array including lenses,
wherein the lenses of the diffusing element diffuse light from the irradiation device in the form of a divergent light flux, an optical axis of the divergent light flux being parallel to optical axes of the first unit lenses, so that as a region on the diffusing element which light enters changes the optical axis of diffused light that enters one first unit lens also changes,
wherein a pitch of the lenses of the diffusing element is smaller than a pitch of the first unit lenses, and
wherein in a plane parallel to an optical axis of a first unit lens and crossing the first unit lens along a width, a diffusion angle of diffused light exiting the diffusing element is equal to or less than an acceptable angle formed between two line segments extending from a principal point of a second unit lens, corresponding to the first unit lens, to both ends of the first unit lens.

2. The illumination device according to claim 1, wherein any region on the first lens array that diffused light from the diffusing element enters at a moment includes at least one first unit lens.

3. The illumination device according to claim 1, wherein the principal point of each second unit lens is located on a rear focal point of the first unit lens corresponding to the second unit lens.

4. The illumination device according to claim 1, wherein the lens array of the diffusing element includes concave lenses.

5. A projector comprising:
the illumination device according to claim 1; and
a spatial light modulator to be illuminated with light from the illumination device.

6. The projector according to claim 5, further comprising an integrator rod disposed between the second lens array and the spatial light modulator.

7. The projector according to claim 6, further comprising a relay optical system disposed between the integrator rod and the spatial light modulator.

8. The illumination device according to claim 1, wherein the optical axis of the first unit lens is parallel to the optical axis of the second unit lens corresponding to the first unit lens.

9. The illumination device according to claim 1, wherein the diameter of a first unit lens is the same as the diameter of the second unit lens corresponding to the first unit lens.

10. The illumination device according to claim 1, wherein the scanner includes a mirror, and the reflecting surface of the mirror is rotatable about a first rotation axis and a second rotation axis intersecting the first rotation axis.

11. The illumination device according to claim 1, wherein the light source device includes a plurality of light sources configured to generate lights of different wavelength bands.

* * * * *